(12) United States Patent
Gilfert et al.

(10) Patent No.: US 8,887,916 B2
(45) Date of Patent: Nov. 18, 2014

(54) BOTTLE SHIPPING SYSTEM (71) Applicant: Fibercel Packaging, LLC, Portville, NY (US)

(72) Inventors: James W. Gilfert, Eldred, PA (US); Mitchell R. Gray, Great Valley, NY (US); Robert V. Schmick, Great Valley, NY (US); James F. Richter, Little Genesee, NY (US)

(73) Assignee: Fibercel Packaging, LLC, Portville, NY (US)

( * ) Notice: Subject to any disclaimer, the term of this patent is extended or adjusted under 35 U.S.C. 154(b) by 0 days.

(21) Appl. No.: 13/900,962

(22) Filed: May 23, 2013

(65) Prior Publication Data

US 2013/0313145 A1 Nov. 28, 2013

Related U.S. Application Data (60) Provisional application No. 61/651,141, filed on May 24, 2012.

(51) Int. Cl.
*B65D 81/113* (2006.01)
*B65B 21/24* (2006.01)

(52) U.S. Cl.
CPC .............. *B65D 81/113* (2013.01); *B65B 21/24* (2013.01)
USPC ............... 206/433; 220/510; 53/448; 53/48.1

(58) Field of Classification Search
USPC .................... 206/427, 433, 193, 521, 521.15; 220/509, 510, 512, 513; 53/472, 467, 53/443, 448, 48.1, 49
See application file for complete search history.

(56) References Cited

U.S. PATENT DOCUMENTS

| 871,452 A | 11/1907 | Smith |
| 1,367,069 A | 2/1921 | MacKinnon |
| 1,859,537 A * | 5/1932 | Shofer ..................... 229/120.25 |
| 1,917,886 A | 7/1933 | Hogan |
| 1,970,582 A | 8/1934 | Snyder et al. |

(Continued)

OTHER PUBLICATIONS

An Unofficial Copy of the Prosecution History as of Jun. 27, 2014 for U.S. Appl. No. 12/025,419, filed Feb. 4, 2008; Published Dec. 11, 2008 as US-2008-0302691-A1; Inventor Olson et al.

(Continued)

*Primary Examiner* — Jacob K Ackun
(74) *Attorney, Agent, or Firm* — Duane C. Basch; Basch & Nickerson LLP (57) ABSTRACT

Disclosed are systems and methods for an improved bottle packaging system and shipping container, and more particularly to a container wherein a plurality of inserts are employed to stabilize the bottle(s) and to provide impact resistant cushioning during shipment of liquids and the like. For a 4-bottle (quad) pack embodiment the improved insert design includes a fiber-molded bottom insert placed on the bottom of the carton for receiving the bottoms of a plurality of bottles; a reverse fit top pad fitting over the caps and necks of bottles placed into the carton; and a pair of dividers, said dividers interlocking with one another, and including tabs on the tops and bottoms thereof corresponding to recesses in both the bottom insert and the top pad. The inserts, in combination with a cardboard carton may be used to provide a re-usable and recyclable shipping container or package for chemicals and the like.

16 Claims, 9 Drawing Sheets

(56) References Cited

U.S. PATENT DOCUMENTS

| | | | |
|---|---|---|---|
| 2,078,087 A | 4/1937 | Lincoln | |
| 2,094,054 A | 9/1937 | Bixby | |
| D125,136 S | 2/1941 | Holmes | |
| D152,683 S | 2/1949 | Erickson | |
| 2,514,651 A | 7/1950 | Kornfield et al. | |
| 2,570,340 A | 10/1951 | George | |
| 2,717,114 A | 9/1955 | Parham, Jr. | |
| 2,743,030 A * | 4/1956 | Read, Jr. | 220/510 |
| 2,761,553 A | 9/1956 | Wheeler | |
| 2,766,921 A | 10/1956 | Jones et al. | |
| 2,908,383 A | 10/1959 | Vogt | |
| 3,200,988 A * | 8/1965 | De Chelbor | 206/509 |
| 3,391,814 A | 7/1968 | Box | |
| D214,487 S | 6/1969 | Reichl | |
| D219,956 S | 2/1971 | Clemens | |
| D224,928 S | 10/1972 | Wiley | |
| 3,982,057 A | 9/1976 | Briggs et al. | |
| 4,093,101 A * | 6/1978 | Braun | 220/516 |
| 4,094,454 A | 6/1978 | Snyder | |
| 4,195,732 A | 4/1980 | Bell | |
| 4,382,106 A | 5/1983 | Royster | |
| 4,499,997 A * | 2/1985 | Swingley, Jr. | 206/509 |
| 4,567,981 A | 2/1986 | Headon | |
| 4,625,908 A * | 12/1986 | Emery | 206/427 |
| 4,635,810 A * | 1/1987 | Tate | 220/510 |
| 4,700,836 A | 10/1987 | Hammett | |
| 4,703,855 A * | 11/1987 | Moe et al. | 206/427 |
| D305,729 S | 1/1990 | Bridel | |
| 4,911,300 A * | 3/1990 | Colonna | 206/427 |
| 5,000,372 A | 3/1991 | Hollander et al. | |
| 5,038,961 A | 8/1991 | Watanabe et al. | |
| 5,071,026 A | 12/1991 | Apps | |
| 5,080,314 A | 1/1992 | Moyer et al. | |
| D327,972 S | 7/1992 | Apps et al. | |
| D331,538 S | 12/1992 | Fabre | |
| 5,213,211 A | 5/1993 | Umiker | |
| 5,213,215 A | 5/1993 | Prevot | |
| 5,377,862 A | 1/1995 | Oakes et al. | |
| D356,950 S | 4/1995 | Apps et al. | |
| 5,429,264 A | 7/1995 | Hollander et al. | |
| D361,513 S | 8/1995 | Adami et al. | |
| 5,492,267 A | 2/1996 | Hollander et al. | |
| 5,577,614 A | 11/1996 | Palmeroni et al. | |
| 5,669,500 A | 9/1997 | Sutherland | |
| 5,785,239 A | 7/1998 | Campbell et al. | |
| D400,012 S | 10/1998 | Apps | |
| D403,961 S | 1/1999 | Warren | |
| D408,737 S | 4/1999 | Warren, Jr. | |
| 5,899,331 A | 5/1999 | Warren, Jr. | |
| 5,934,467 A | 8/1999 | Gilfert et al. | |
| 5,975,300 A * | 11/1999 | Gale | 206/433 |
| 6,021,913 A | 2/2000 | McGrath | |
| 6,142,440 A | 11/2000 | Gratz et al. | |
| 6,209,839 B1 | 4/2001 | O'Malley | |
| D441,516 S | 5/2001 | Wheaton | |
| 6,237,758 B1 | 5/2001 | Hsu | |
| D445,253 S | 7/2001 | Hammett | |
| 6,290,057 B1 | 9/2001 | Hurley | |
| 6,322,034 B1 | 11/2001 | O'Malley | |
| 6,336,556 B1 * | 1/2002 | Gale | 206/427 |
| D461,054 S | 8/2002 | Hammett | |
| D461,715 S | 8/2002 | Hamada et al. | |
| D461,957 S | 8/2002 | Hammett | |
| 6,474,613 B2 | 11/2002 | O'Malley | |
| 6,527,116 B1 * | 3/2003 | Gale | 206/427 |
| 6,530,476 B1 | 3/2003 | Overholt | |
| 6,536,654 B2 | 3/2003 | Reynolds et al. | |
| 6,537,680 B1 | 3/2003 | Norlander et al. | |
| 6,736,289 B2 | 5/2004 | Cook et al. | |
| 6,820,743 B2 | 11/2004 | Hurley et al. | |
| D518,720 S | 4/2006 | Gratz | |
| D524,651 S | 7/2006 | Perret | |
| D529,401 S | 10/2006 | Aoki | |
| 7,117,994 B2 | 10/2006 | Gratz | |
| 7,134,553 B2 | 11/2006 | Stephens | |
| D535,881 S | 1/2007 | Liukko | |
| D540,711 S | 4/2007 | Howard et al. | |
| D561,025 S | 2/2008 | Gilfert | |
| D561,588 S | 2/2008 | Gilfert | |
| D567,672 S | 4/2008 | Sheu | |
| D588,934 S | 3/2009 | Bailey et al. | |
| D590,715 S | 4/2009 | Gilfert | |
| 8,353,402 B2 * | 1/2013 | Apps | 206/505 |
| 2003/0070951 A1 | 4/2003 | Hurley et al. | |
| 2004/0031711 A1 | 2/2004 | O'Malley | |
| 2004/0216426 A1 * | 11/2004 | Kilmartin | 53/411 |
| 2005/0189243 A1 | 9/2005 | Manabe et al. | |
| 2006/0243784 A1 | 11/2006 | Glaser et al. | |
| 2007/0138047 A1 | 6/2007 | Berglin | |
| 2008/0302691 A1 | 12/2008 | Olson et al. | |
| 2010/0112292 A1 | 5/2010 | Gilfert | |
| 2011/0024318 A1 | 2/2011 | Gilfert | |
| 2012/0061273 A1 * | 3/2012 | Taljaard et al. | 206/427 |
| 2013/0240395 A1 * | 9/2013 | Hall | 206/433 |

OTHER PUBLICATIONS

An Unofficial Copy of the Prosecution History as of Jun. 27, 2014 for U.S. Appl. No. 12/613,041, filed Nov. 5, 2009; Published May 6, 2010 as US-2010-0112292-A11 Inventor James W. Gilfert.

An Unofficial Copy of the Prosecution History as of Jun. 27, 2014 for U.S. Appl. No. 12/796,263, filed Jun. 8, 2010; Published Feb. 3, 2011 as US-2011-0024318-A1; Inventor James W. Gilfert.

* cited by examiner

BOTTLE SHIPPING SYSTEM

Priority is claimed from U.S. Provisional Patent Application 61/651,141 for a "BOTTLE SHIPPING SYSTEM" filed May 24, 2012 by James W. Gilfert et al., and cross-reference is made to abandoned U.S. patent application Ser. No. 12/025,419 (U.S. Patent Publication 2008/0302691 A1) for a "BOTTLE SHIPPING SYSTEM WITH MULTIPURPOSE INSERT," filed Feb. 4, 2008 by M. Olson et al., both of which are hereby incorporated by reference in their entirety.

The disclosed packaging system is directed to an improved bottle shipping container, and more particularly to a container wherein a plurality of inserts are employed to stabilize the bottle(s) and to provide impact resistant cushioning during shipment of liquids and the like for a 4-bottle (quad) pack embodiment. The improved insert design includes a base, interlocking dividers and a reverse fit top pad. The inserts, in combination with a two-layer cardboard or corrugated box, are used for shipping bottled chemicals and the like.

BACKGROUND AND SUMMARY

Glass bottles and similar containers are used for shipment of liquid products that may, for one reason or another, not be storable or shippable in plastic containers (e.g., made from polystyrene, polypropylene or polyvinyl chloride). For example, chemical products that must retain a high level of purity are shipped in glass bottles because of the adverse reactions with plastic containers. However, glass bottles are fragile and prone to shattering on impact with surfaces or one another. Therefore, it is necessary to cushion glass bottles containing chemical products to prevent breakage during shipping and storage. This is necessary, not only to protect the product itself, but also because these products are frequently solvents or other chemicals that present an environmental hazard if leaked or spilled.

Disposing of packaging material is an additional burden on those who receive bottles and who are already burdened with disposing of not only chemical waste but also of the bottles and packaging materials themselves. Any arrangement that can reduce the disposal burden on an end user of chemical products shipped and stored in bottles is of substantial importance. Moreover, it is desirable that such packaging materials be recyclable and made from recycled, or at a minimum, biodegradable materials.

Currently, it is generally known to package bottles of chemicals in expanded foam polystyrene (EPS) packing material, which is placed around the bottles within a corrugated paper board container. A drawback of using EPS is that solvents in or on the bottles can dissolve the EPS, thus reducing or eliminating its cushioning purpose. Moreover, once the package is opened there are two discreet material groups which must be disposed of—the corrugated paper board as well as the expanded polystyrene. Polystyrene foam also has environmental impacts itself, both because the gases that it releases as it decomposes and because of its exaggerated physical presence resulting from its rigid expanded cell structure that consumes a great deal of volume in landfills. Restricting the use of foamed polystyrene packaging is a priority of many solid waste and environmental organizations as well as governments. For example, a number of US cities have banned polystyrene food packaging.

In view of these considerations, there is a continuing need for an economical replacement of polystyrene with a packing system that eliminates the dual waste streams, and that uses a biodegradable packing material for which there are established, environment-friendly waste management processes in place. One such solution is a packaging system and method described in U.S. patent application Ser. No. 12/025,419 (US 2008/0302691 A1) for a "BOTTLE SHIPPING SYSTEM WITH MULTIPURPOSE INSERT."

In light of the above-noted problems, the packaging system disclosed herein provides an improved package with several molded inserts including a base, interlocking dividers and a reverse fit top pad. More specifically, the system provides both impact protection and cushioning for the bottle(s), and also assures the ease of use and re-use of such a system. Furthermore the inserts are preferably manufactured from molded paper or pulp materials that may include recycled content and are similarly recyclable or biodegradable.

Disclosed herein is a bottle packaging system, comprising: a carton having paper board panels defining a space, the panels meeting to define a plurality of interior corners; a fiber-molded bottom insert placed on the bottom of the carton for receiving the bottoms of a plurality of bottles; a reverse fit top pad fitting over the caps and necks of bottles placed into the carton; and a pair of dividers, said dividers interlocking with one another, said dividers further including tabs on the tops and bottoms therefor, said tabs being inserted into corresponding recesses in both the bottom insert and the top pad.

Also disclosed herein is a method for packaging a plurality of bottles, comprising: assembling a carton having paper board panels defining a space, the panels meeting to define a plurality of interior corners; placing a fiber-molded bottom insert on the bottom of the carton for receiving the bottoms of a plurality of bottles; assembling a pair of dividers, said dividers interlocking with one another along a slot therein, and placing the dividers into the carton so that tabs on the lower side thereof are inserted into corresponding recesses in both the bottom insert; and placing a reverse fit top pad fitting over the caps and necks of bottles placed into the carton, wherein tabs on the tops of said dividers are inserted into corresponding recesses in the top pad.

The various embodiments described herein are not intended to limit the invention to those embodiments described. On the contrary, the intent is to cover all alternatives, modifications, and equivalents as may be included within the spirit and scope of the appended claims.

DETAILED DESCRIPTION

As more particularly set forth below, the disclosed system and methods are for assembling an improved bottle shipping container, specifically a container wherein insert(s) or separator(s) are employed, in conjunction with a top cap insert to stabilize the bottle(s) and to provide padding during shipment and handling. As used herein the term bottle is intended to cover both a conventional glass bottle having a base, sides, shoulder, neck and re-sealable top, as well as other types of containers used for the storage and shipment of liquids and the like. The various embodiments described herein disclose several configurations for the shipping containers, and it is further contemplated that the shipping systems may also be used to ship containers other than traditional bottles. Accordingly, the use of the term bottles is not intended to limit the disclosure or claims to conventional bottles or bottle designs. The improved insert designs and associated packaging system permits stabilization of the necked bottle(s) used for shipping chemicals and the like. Although generally described relative to a 4-bottle (quad) pack, it will be appreciated that the disclosed inserts may be employed in packaging for any number of bottles (e.g., a single, double, triple, quad and six-pack configuration). Moreover, various sizes and types of bottles may be packaged using the disclosed inserts, or modifications thereof.

Figure 1:
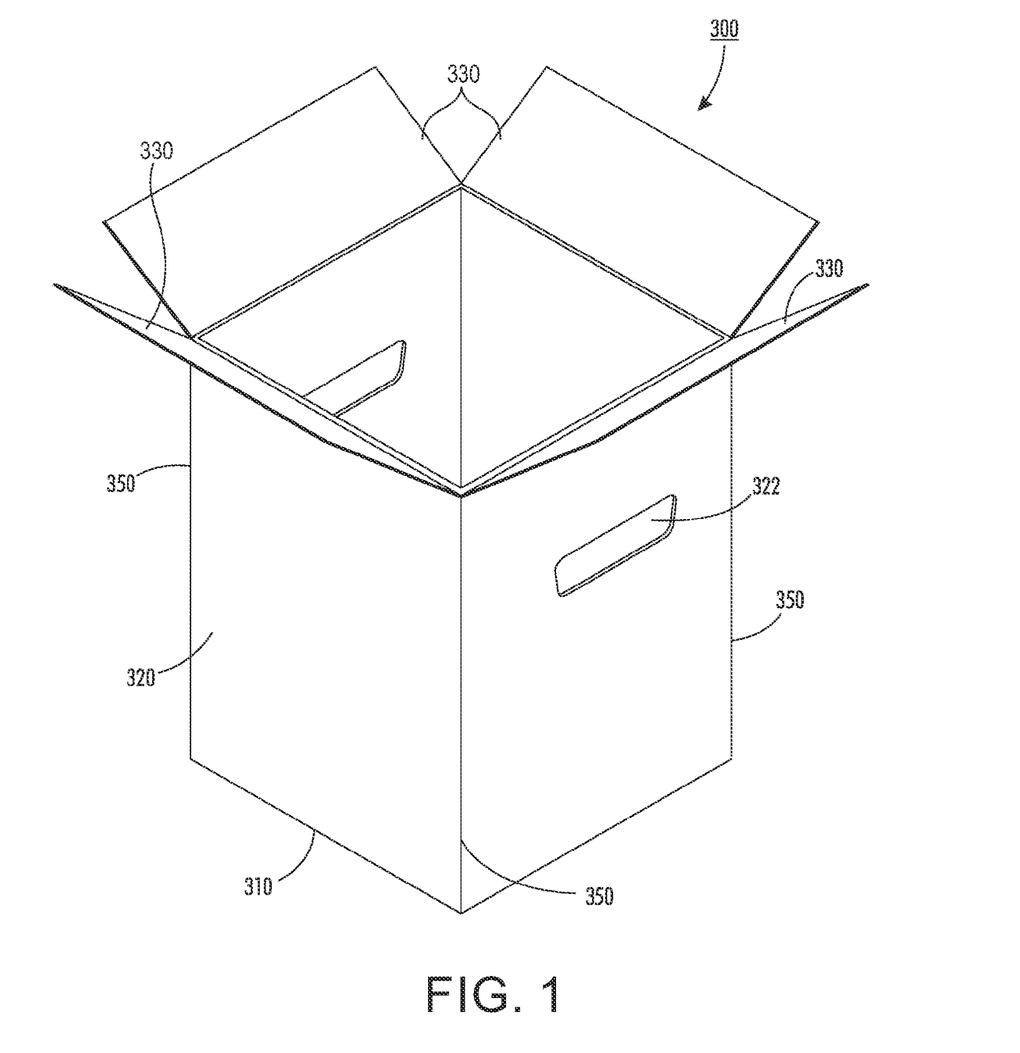
FIG. 1 is a perspective view of an exemplary corrugated cardboard shipping container for the disclosed bottle packaging system.

FIG. 1 shows an empty corrugated paper board carton 300, consisting of single- or double-walled conventional construction. It will be appreciated that various configurations of the carton may be employed, but it would include a bottom panel(s) 310, side panels 320, and top panel(s) 330. The side panels 320 define a generally square or rectangular package cross-section having at least four corners 350. As will be further appreciated, the carton may be further reinforced, and may have alternate shapes and features such as hand-holes 322 as may be required by the particular application or types of containers being stored and shipped therein.

Figure 2:
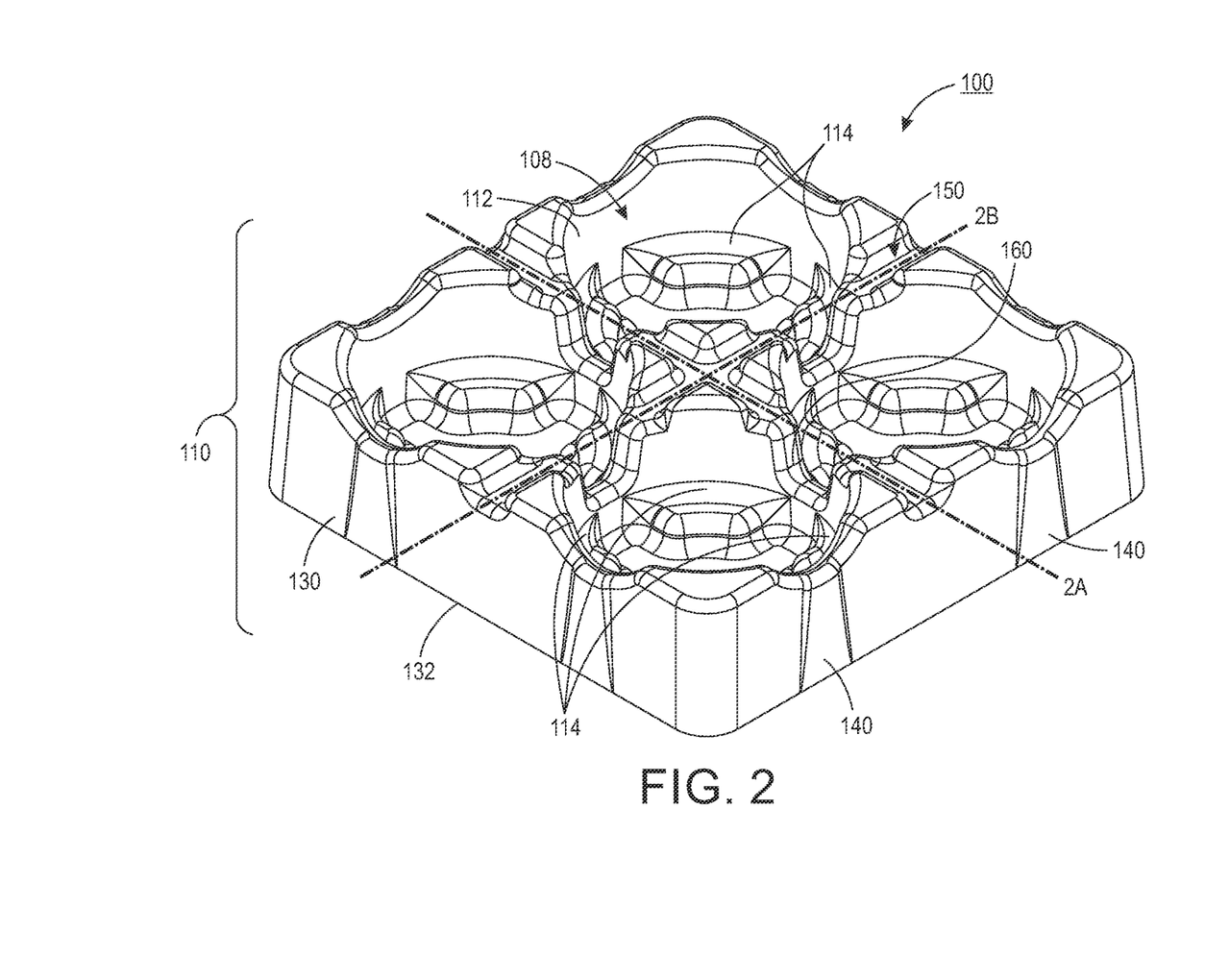
FIGS. 2 and 3 are, respectively, perspective and side views of a base insert employed in an embodiment of the disclosed packaging system.
Figure 3:
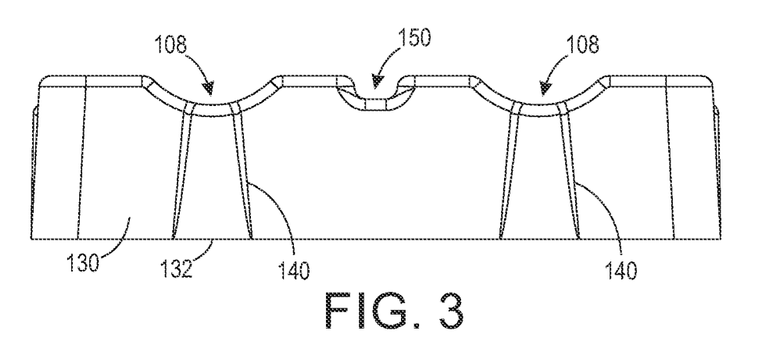
Figure 4:
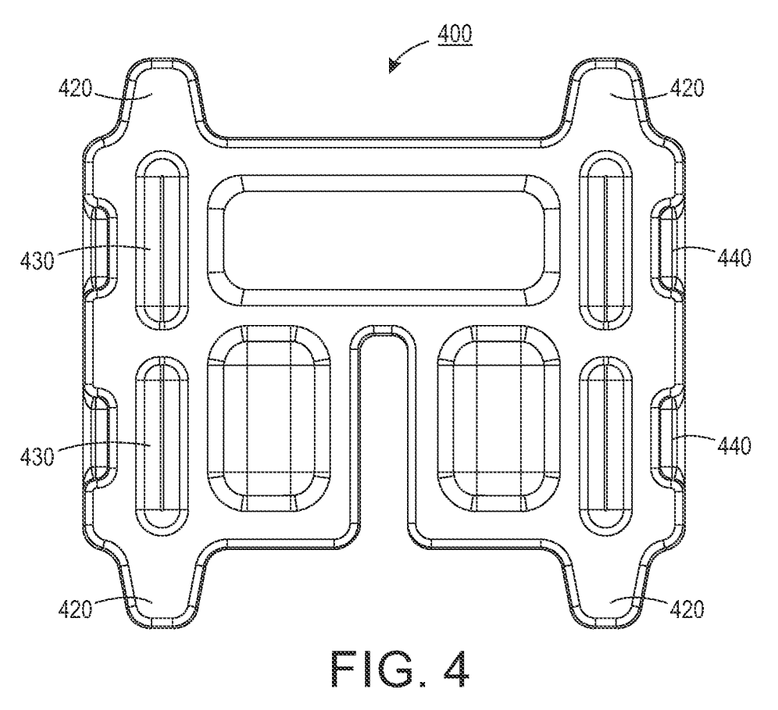
FIGS. 4 and 5 are top and perspective views, respectively, of a interlocking dividers in accordance with another aspect of the packaging system.
Figure 5:
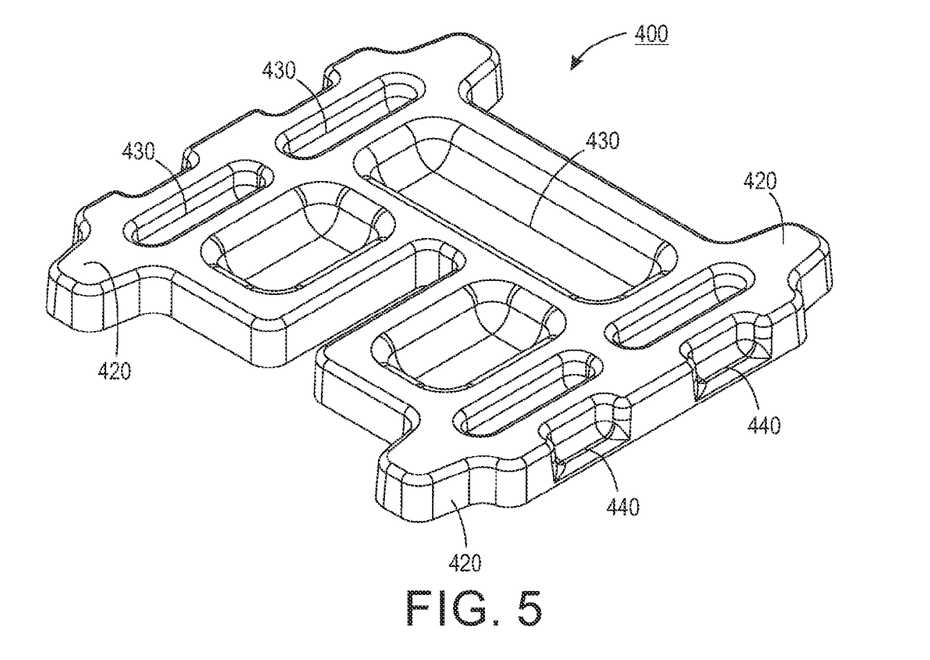

Referring also to FIGS. 2-3, depicted therein are respective perspective and side views of a base insert 100. The figures illustrate the relationship of various features of the base insert 100 which is designed to be placed on the bottom of the carton 300 in FIG. 1. The base insert 100 includes a plurality of (e.g., four) packaging cells 110 as generally defined by dashed lines 2A and 2B which pass through the center of a groove 150 that further serves to define the cells and to receive and retain the lower edge of a divider (e.g., FIG. 6, 400) therein. Thus, the width and shape of the groove should be consistent with the lower, contacting edge 450 of the divider. Each cell comprises a generally cylindrical depression 108 defined by a continuous wall 112. A lower portion of the depression, at the base of wall 112, includes a shoulder extending in segments 114 about the bottom thereof. The shoulder segments 114 provide contact points for the lower part or bottom of a bottle partially inserted into the depression. The insert 100 also includes a generally circular hole 120 located in the center and bottom of each depression. The insert has an outer skirt 130, extending around the perimeter of the insert in an almost vertical direction with a slight positive draft of about 1 to about 5 degrees, preferably about 3 degrees. The skirt extends substantially all the way around the entire periphery of the insert to provide a continuous lower edge in contact with the inside bottom panels 310 of carton 300 when inserted therein. It will also be appreciated that the cylindrical walls 112 are not completely cylindrical in shape but may have a similar draft or taper, being slightly smaller in diameter at the bottom where the bottle-bottom is received, as will be further described below.

Continuing with FIGS. 2-3, a thicker and solid, or semi-solid, rib 140 extends between the cylindrical walls of packing cells 110 and outer skirt 130, such that ribs 140 maintain the spaced-apart relationship between the cells and the skirt and resist the compaction or compression of skirt 130 relative to the cylindrical walls of each packing cell 110. When a bottle (e.g., 200 in FIGS. 10, 11) is inserted within each cell 110, the bottle is in frictional contact with the wall 112 so that the bottle is held in position during shipping and storage.

Figure 6:
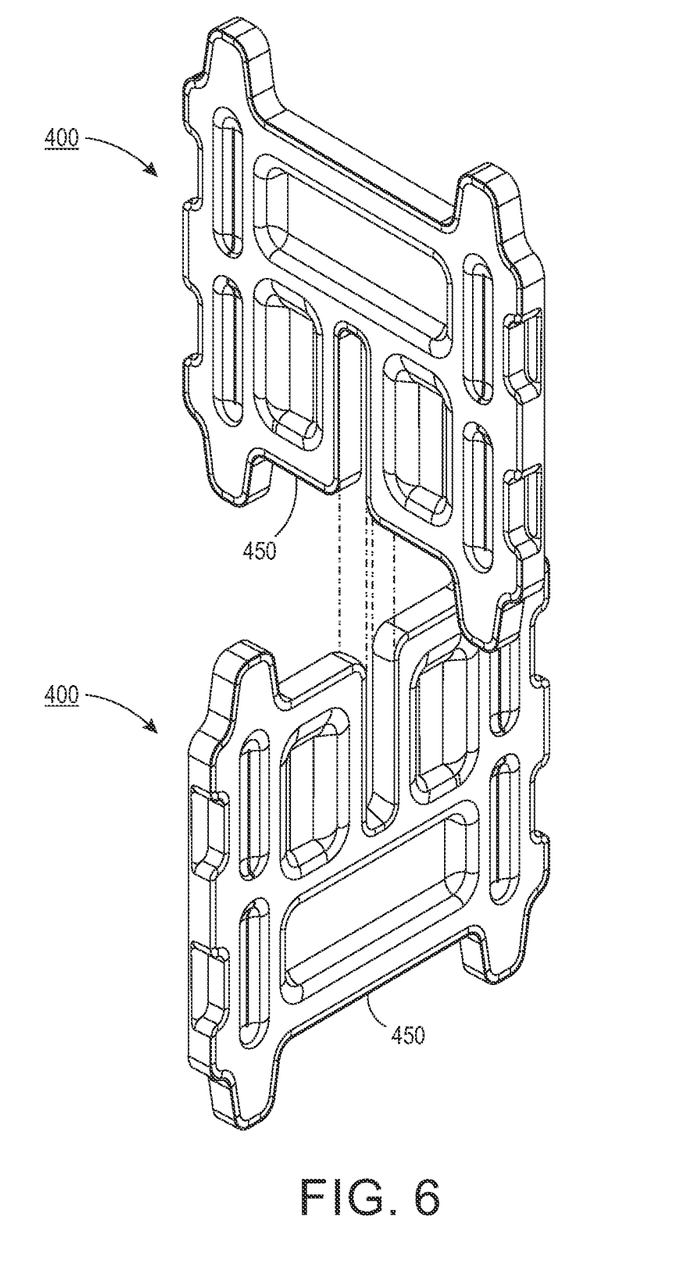
FIG. 6 is an illustration of the manner in which a pair of dividers of FIGS. 4 and 5, are interlockingly connected.
Figure 7:
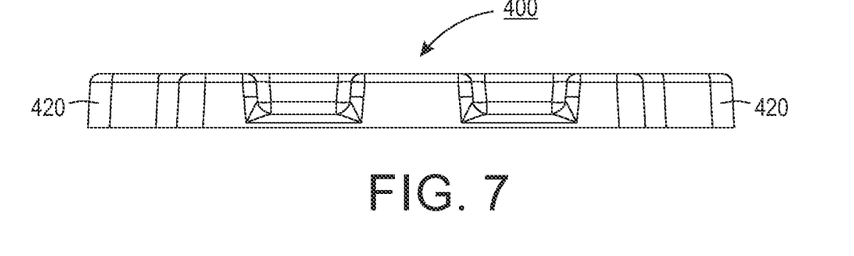
FIG. 7 is a side view of the dividers of FIGS. 4-6.

Referring next to FIGS. 4-7, depicted therein are drawings of a divider 400 of which two dividers would be used in an interlocking relationship (e.g., FIG. 6) to keep bottles separated in a quad pack. More specifically, the dividers each include a slot 410 which permits a pair of dividers to be interlockingly attached or conjoined to form an "X" shaped assembly. The manner in which dividers 400 are interlockingly assembled is illustrated in FIG. 6, for example, there the slots of the two dividers are aligned and the dividers are pressed together. Dividers 400 further include tabs 420 on the tops and bottoms thereof. Tabs 420 are aligned with and received within a similarly shaped pocket or recess 160 in base 100 and recess 660 in top pad 600 as further described below. The dividers, like base 100, include reinforced or thicker fiber portions 430 that provide cushioning between adjacent bottles in an assembled package. For example, the reinforced recesses along the outer edges (in line with tabs 420) are aligned near the edge that, when the packaging is assembled, is at the closest point between the bottles (e.g., 200 in FIG. 11) that are placed in the package. The dividers also include indents 440 that serve to reinforce the edge of the divider, again within or near the region of smallest separation between bottles. As a result of the reinforced portions 430, tabs 420 and indents 440, alone or in combination, the divider provides additional cushioning that prevents the bottles from colliding with one another, even upon dropping of the carton with filled bottles in it. As illustrated, at least one side of each divider is formed against a mold or similar surface and slot 410 allows two dividers to be engaged before of while being placed within a carton and having tabs 420 inserted within recesses 160 and 660. Once the tabs are inserted into the recesses, the dividers become "anchored" to the respective base and top piece and provide the desired padding between bottles, even when the containers are dropped.

Figure 8:
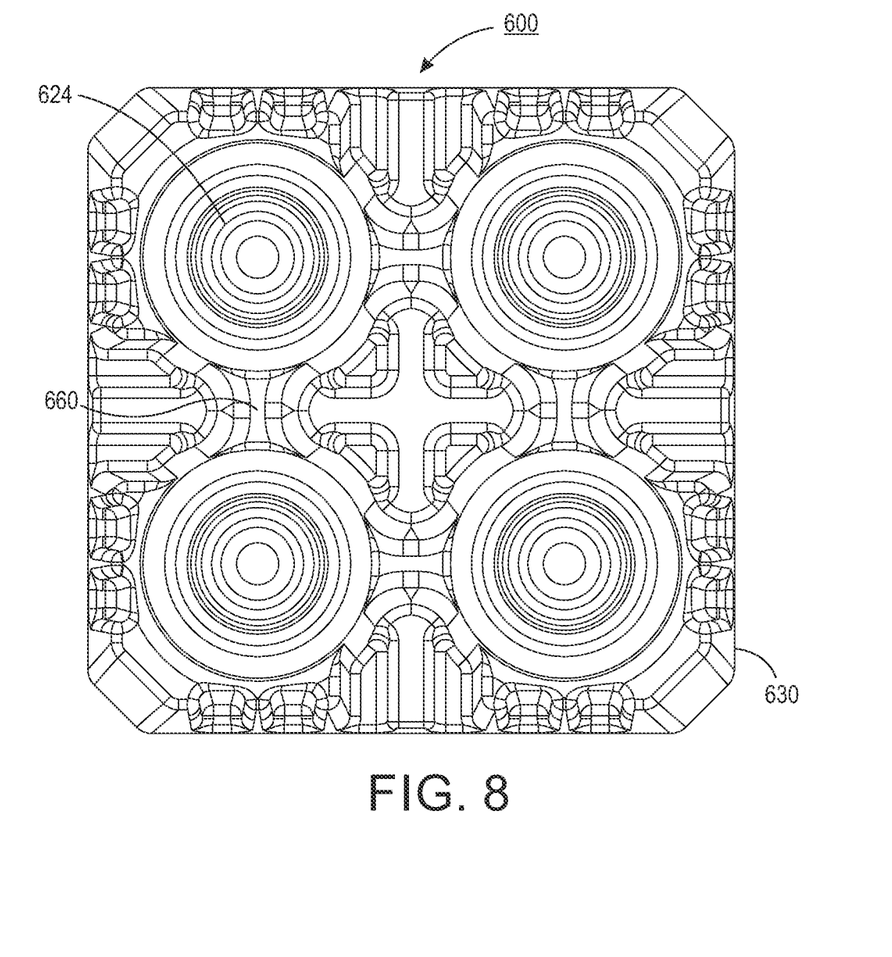
FIGS. 8 and 9 are, respectively, top and perspective view of a top cap insert in accordance with another aspect of the disclosed bottle packaging system.
Figure 9:
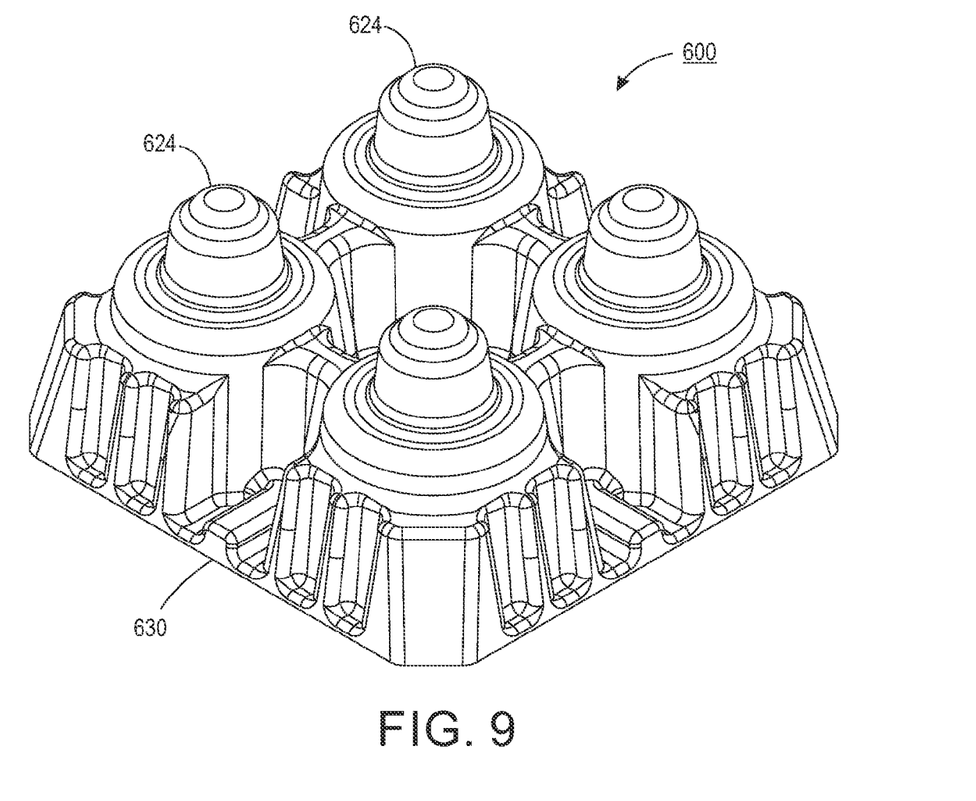
Figure 10:
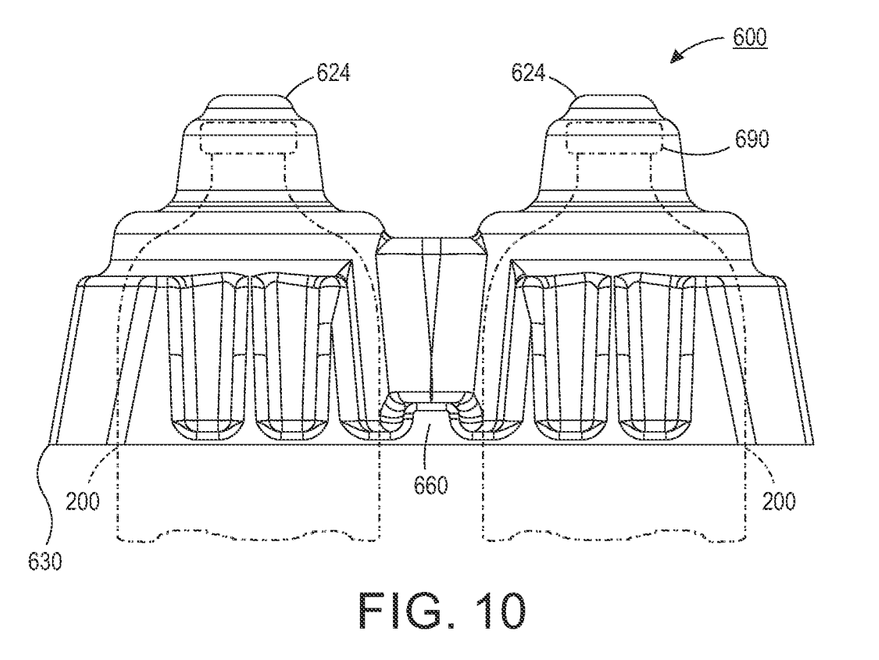
FIG. 10 is a side view of the top cap depicted in FIGS. 8 and 9, further illustrating the manner in which bottle tops and necks are retained therein.

The packaging system described may further include top pad or insert 600 for maintaining the position of the bottle necks and/or caps in relation to the carton 300 and other bottles (if present). Referring to FIGS. 8-10, the top pad includes a series of recesses 660 into which the necks and caps of associated bottles extend, and further provide a padding/crush region 624 above each cap 690, where when applied over the tops of the caps, the crush region 624 separates the bottle caps from the underside of top flaps 330 of carton 300. As with the base, the top cap 600 also includes a tapered skirt 630 extending about the periphery of the cap and positioning the top cap relative to the sides of a carton when inserted therein.

Figure 11:
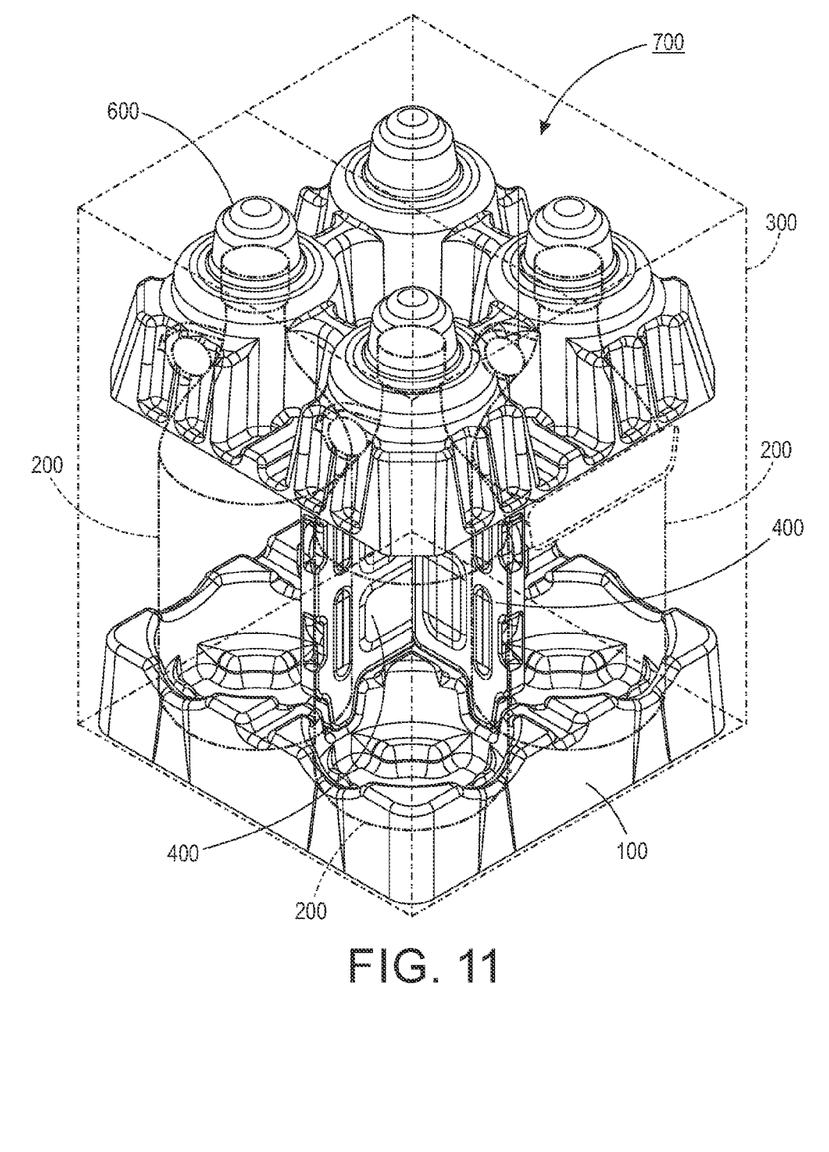
FIG. 11 is a perspective cut-away view of an assembled bottle packaging system.

As illustrated, for example, in the assembled bottle packaging system embodiment of FIG. 11, the packaging system 700 employs a carton 300 of a generally rectangular cross section having a top, bottom and sides, wherein the top and bottom may be formed of several flaps that are aligned or overlap for taping or sealing. Alternative shapes and sizes would be contemplated based upon the size of the bottles or other items being shipped. In order to assure the recyclability of the packaging, in one embodiment, the inserts (base 100, dividers 400 and top 600) are made of a recyclable material selected from the group consisting of: cellulose, paper pulp, sugar cane, palm waste, and expanded starches. The packaging system inserts may be made from re-cycled fibrous material consisting of recycled paper products.

It will be appreciated that the dimensions, orientation and sizes of the insert and respective recesses/shoulders may be adjusted in accordance with the configuration and design of the bottles or other elements being retained by the insert. It will be further appreciated that the design of the insert is intended for production in a fiber molding operation and accordingly includes drafts and angled portions to permit easy molding and removal of the insert from a mold. In one embodiment, the fiber or pulp used to form the inserts may include at least 50% Kraft paper material and less than 50% newsprint, and more particularly, about 60% Kraft paper and about 40% newsprint. It is however, possible to use varying compositions, even compositions that are at or about 100% Kraft paper material, or at or about 100% newsprint, as well as compositions that utilize alternative types of pulp/fiber materials as noted herein. One source of such materials may be recycled paper products such as cardboard, newsprint, etc.

One process for creating the inserts involves creating a vacuum formed plastic mold representative of the insert shape depicted in the embodiments described above. This mold or "tooling" is mounted on a plate, which is subsequently mounted in pans of pulp molding machines. These machines include a tank that is continuously supplied with slurry of corrugated Kraft and newsprint pulp. The pans are attached to a rotating wheel and as the wheel revolves, the pans are submerged in the pulp tank. The molds are connected to a vacuum, which draws the pulp solids onto the mold surface and removes water. At the end of a rotation of the wheel, the individual pan reaches the unload station where an air blast blows the semi-solid pulp insert off of the mold and onto a negative fixture for support. The insert is then transferred directly to a belt for drying, possibly using a large, zoned drying oven (e.g. gas-fired), which removes most of the remaining moisture from the molded material. At the end of the oven, the inserts may be packed for shipment. In the case of the top pad, the insert is subjected to a "press" from the back side with the "take off cover" when the part is blown off the molding tool.

As briefly mentioned above various alternative materials may also be used, including various pulps, cellulose, sugar cane waste, palm waste, expanded starches, and foams (EPS). Preferably the materials employed in making the insert are recycled and/or recyclable. It is also contemplated that various handling tools and techniques may be employed to assist in the removal of the molded fiber inserts prior to and/or during a drying process (e.g. before stiffness and dryness of the insert achieves a desired level).

The packaging system employing the disclosed inserts not only provides for inexpensive packaging, it further provides a solution that is resistant to bottle breakage or damage. Molded pulp packaging protects the product and can safely cushion even the most delicate contents such as a bottle(s). A lightweight and cost-effective alternative to most conventional types of packaging, the product is made from 100% recycled materials and is 100% biodegradable.

Although described herein relative to a fiber-based insert, the disclosed system may indeed be suitable for use with alternative packaging materials, including biodegradable or other plastics, starch compounds, etc. Another possible manufacturing process may involve a vacuum-formed plastic having insert shape depicted in the embodiments. It will be appreciated that other techniques such as blow-molding and the like may also be used to manufacture the inserts. It should be further appreciated that various alternative materials may also be used, including various pulps, cellulose, sugar cane waste, palm waste, expanded starches, and foams (EPS). The materials employed in making the insert are preferably recycled, recyclable, or in the alternative biodegradable.

It will be appreciated that variations of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A bottle packaging system, comprising:
   a carton having paper board panels defining a space, the panels meeting to define a plurality of interior corners;
   a fiber-molded base inserted at the bottom of the carton, said base including a plurality of cells for receiving bottoms of each of a plurality of bottles;
   a reverse fit top pad contacting caps and fitting over necks of each of the plurality bottles placed into the carton; and
   a pair of interlocked dividers, said dividers further including tabs on the tops and bottoms thereof, wherein said tabs are inserted into and remain in contact with corresponding recesses in both the bottom insert and the top pad.

2. The packaging system according to claim 1, wherein the top pad further includes a crush zone located above the top of each bottle cap for cushioning the top of the bottle relative to the top of the carton.

3. The packaging system according to claim 1, wherein said dividers each have the same design.

4. The packaging system according to claim 3, wherein said dividers each include thicker fiber portions that provide cushioning between adjacent bottles in the packaging system.

5. The packaging system according to claim 4, wherein at least one of said base and said top pad include a skirt to maintain position thereof relative to interior surfaces of side panels of said carton.

6. The packaging system according to claim 4, wherein said thicker fiber portions are in general vertical alignment with the tabs on the dividers.

7. The packaging system according to claim 4, wherein the corresponding recesses in the base and top pad receive corresponding tabs from the dividers and are located in locations generally between adjacent bottle cells, such that thickened fiber portions and tabs on the dividers, in combination with the recesses, are in general vertical alignment with the tabs on the dividers to prevent contact of bottles when in the packaging system.

8. The packaging system according to claim 1, wherein said base further includes at least one groove between the cells, wherein said groove is of sufficient size to receive a lower edge of the divider.

9. A method for packaging a plurality of bottles, comprising:
   assembling a carton having paper board panels defining a space, the panels meeting to define a plurality of interior corners;
   placing a fiber-molded base on the bottom of the carton, the base including a plurality of cells for receiving the bottoms of a plurality of bottles;
   assembling a pair of dividers, said dividers interlocking with one another along a slot therein, and placing the dividers into the carton so that tabs on the lower side thereof are inserted into corresponding recesses in both the bottom insert; and
   placing a reverse fit top pad fitting over the caps and necks of bottles placed into the carton, wherein tabs on the tops of said dividers are inserted into corresponding recesses in the top pad.

10. The method according to claim 9, wherein a crush zone is included in the top pad, located above the top of each bottle cap, for cushioning the top of the bottle relative to the top of the carton.

11. The method according to claim 9, wherein the dividers each have the same design.

12. The method according to claim 11, further including producing said dividers to include thickened fiber portions in at least the area between adjacent bottle cells.

13. The method according to claim 12, further including producing said base and said top pad include a tapered skirt to maintain the positions of the base and top pad relative to interior surfaces of the carton side panels.

14. The method according to claim 12, wherein said thicker fiber portions are aligned with the tabs on the dividers.

15. The method according to claim 12, wherein the packaging is assembled so that corresponding recesses in the base and top pad receive corresponding tabs of the dividers, where said recesses and tabs are located between adjacent bottle cells.

16. The method according to claim 9, wherein said base is molded to include at least one groove on an upper surface thereof and between the cells, wherein said groove is of sufficient size to receive a lower edge of the divider.

* * * * *